United States Patent
Lifshitz et al.

(10) Patent No.: US 10,062,141 B2
(45) Date of Patent: *Aug. 28, 2018

(54) SERVER-BASED FAST REMOTE DISPLAY ON CLIENT DEVICES

(71) Applicant: Nubo Software, Airport (IL)

(72) Inventors: Israel Lifshitz, Ganei Tlkva (IL); Ron Munitz, Holon (IL); Meir Shoam, Ramat Gan (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/390,095

(22) Filed: Dec. 23, 2016

(65) Prior Publication Data

US 2017/0109861 A1 Apr. 20, 2017

Related U.S. Application Data

(63) Continuation-in-part of application No. 14/062,343, filed on Oct. 24, 2013, now Pat. No. 9,679,344.

(60) Provisional application No. 61/717,648, filed on Oct. 24, 2012.

(51) Int. Cl.
*H04L 12/825* (2013.01)
*H04L 29/08* (2006.01)
*G06T 1/20* (2006.01)
*H04L 1/00* (2006.01)
*H04L 29/06* (2006.01)

(52) U.S. Cl.
CPC .............. *G06T 1/20* (2013.01); *H04L 1/0002* (2013.01); *H04L 47/25* (2013.01); *H04L 67/10* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 8,504,654 B1* | 8/2013 | Kominac | H04L 67/08 709/217 |
| 2003/0140179 A1* | 7/2003 | Wilt | G06F 9/3851 719/321 |
| 2004/0042476 A1* | 3/2004 | Peacock | H04L 43/00 370/412 |
| 2009/0138516 A1* | 5/2009 | Young | G06F 8/65 |
| 2009/0235161 A1* | 9/2009 | Williams | G06F 17/2247 715/255 |
| 2010/0138154 A1* | 6/2010 | Kon | G01C 21/367 701/455 |
| 2010/0274936 A1* | 10/2010 | Liu | G06F 3/023 710/72 |

(Continued)

*Primary Examiner* — Joni Richer
(74) *Attorney, Agent, or Firm* — Intrinsic Law Corp.

(57) ABSTRACT

A system and method for controlling a display on a client device such as a wireless communication device, e.g., a smartphone or similar device is presented. Aspects of the invention permit a more efficient and fast representation of the desired output onto the client's display including by caching certain display data on the client, temporarily and/or permanently, and transmitting only command and control level data from the server to the client for display of the cached display data. Additional aspects of the invention reduce the volume of data sent between the client device and the server without affecting the experience of the client device user. Additional aspects of the invention provide for secure acquisition and display of data on the client device.

14 Claims, 12 Drawing Sheets

(56) References Cited

U.S. PATENT DOCUMENTS

| | | | |
|---|---|---|---|
| 2011/0157191 A1* | 6/2011 | Huang | G06F 1/3203 345/503 |
| 2011/0213828 A1* | 9/2011 | Tsirkin | H04L 67/36 709/203 |
| 2012/0044266 A1* | 2/2012 | Mori | G09G 5/34 345/649 |
| 2012/0079132 A1* | 3/2012 | Liu | H04L 1/0002 709/233 |
| 2012/0198545 A1* | 8/2012 | Keenan | G09G 5/14 726/18 |

* cited by examiner

20

70

```
[GATEWAY] (LOG:751) sendDrawCmd CmdCode: 18, cmd bytes=142, total bytes=117367
[GATEWAY] (LOG:752) sendDrawCmd CmdCode: 18, cmd bytes=142, total bytes=117509
[GATEWAY] (LOG:753) sendDrawCmd CmdCode: 18, cmd bytes=142, total bytes=117651
[GATEWAY] (LOG:754) sendDrawCmd CmdCode: 18, cmd bytes=142, total bytes=117793
[GATEWAY] (LOG:755) sendDrawCmd CmdCode: 18, cmd bytes=142, total bytes=117935
[GATEWAY] (LOG:756) sendDrawCmd CmdCode: 18, cmd bytes=142, total bytes=118077
[GATEWAY] (LOG:757) sendDrawCmd CmdCode: 18, cmd bytes=142, total bytes=118219
[GATEWAY] (LOG:758) sendDrawCmd CmdCode: 18, cmd bytes=142, total bytes=118361
[GATEWAY] (LOG:759) sendDrawCmd CmdCode: 18, cmd bytes=142, total bytes=118503
[GATEWAY] (LOG:760) sendDrawCmd CmdCode: 67, cmd bytes=175, total bytes=118678
```

Fig. 7

SERVER-BASED FAST REMOTE DISPLAY ON CLIENT DEVICES

RELATED APPLICATIONS

This application is a continuation-in-part of U.S. patent application Ser. No. 14/062,343, entitled "Server-Based Fast Remote Display on Client Devices," filed on Oct. 24, 2013, which claims priority to U.S. Provisional Application No. 61/717,648, entitled "Cloud Server with Fast Remote Display on Client Computing Devices," filed on Oct. 24, 2012, both of which are hereby incorporated by reference.

TECHNICAL FIELD

The present disclosure generally relates to serving information from a server to a client for efficient and fast display of the information on the client. The client can be a computing device, for example a mobile computing device or communication device.

BACKGROUND

It is known in the art to serve content, including text, graphics, multimedia or other pages in a variety of formats from a server to a client. It is also known that client devices can include display devices on which visual representations of information can be presented, and that the client devices usually include graphics hardware and software for rendering or generating the viewable display contents. A server can be employed to generate data, transmitted to a client over a communication network, which is then used to generate the viewable content on the client's display.

Some systems generate information at the server and rely on the client to generate the graphical content to be presented on its display. However, other systems allow a server to more directly control the contents of a client's display by generating the graphical information in graphic format at the server and delivering this graphic data to the client for presentation.

For example, the X Window (sometimes X11) framework, originating at MIT, provided a windowing system for bitmap display of information of a client terminal, said bitmap generated substantially by a server, although the client machine's hardware and software remained necessary to facilitate the physical transfer of viewable content to the client screen. FIG. 1 illustrates the prior art X Windows architecture 10 as publicly described at http://en.wikipedia.org/wiki/X-windows. The cited Web page is only mentioned as a descriptive aid, which may or may not in itself be prior art, but it describes its authors' opinion of the X Windows prior art, and like any Web page, it may not be accurate and it may be altered or removed from time to time by its provider. An example of a display output 20 resulting on a client computer, from the same public source is shown in FIG. 2. X Windows therefore allowed programmers to engage a toolbox to leverage the graphical user interface (GUI) building blocks on a client machine running some operating system (OS). The result aimed to replicate the behavior of local operation of the GUI applications in general and allowed a client user to interact with the applications using the usual client-based GUI interface methods.

Another more recent example of desktop virtualization technology was offered by Citrix Systems, Inc. in the context of software as a service (SaaS) and cloud computing environments. These applications allowed users to receive server-based data to virtually run applications on the client.

Other prior art provided streaming of display data to a client machine, but such systems are limited by the speed or bandwidth of the server-client communication link. Also, such systems are limited by the computing resources available to the client (or in some cases the server) which limit the number of windows, frames, pixels, or display data generally from being delivered to the client. Most difficult would be graphics-intensive applications requiring realtime delivery of high frame rates to the client over the communication link.

Despite the virtual desktop and remote access technologies known in the art, there remains a need to improve the effectiveness, efficiency and speed of applications that rely on server-client content provided over a network, especially for relatively small client devices like smartphones that have limited local resources and communication bandwidth and graphics capabilities. This disclosure addresses systems and methods for doing so.

SUMMARY

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings.

In an aspect, the invention is directed to a method for controlling a display of a client device. The method comprises, in a server coupled to said client device by a communication link: determining a desired display state of said display including determining display data needed to achieve said desired display state; generating draw commands comprising instructions for configuring said display of the client device to achieve the desired display state; placing the draw commands in a draw command queue to send to the client device over a network communication link; monitoring a length of the draw command queue, the length corresponding to a number of the draw commands in the draw command queue; determining if the length of the draw command queue exceeds a threshold value; and reducing a number of new draw commands generated when the length of the draw command queue exceeds the threshold value.

Another aspect of the invention is directed to a server system comprising: a processor; a communication link interface coupling said server to a connected client device; a data storage unit including a location storing prestored display data sent by said server to said client device; a data storage unit including a location storing draw commands; an input event generator for handling input event signals from said client device; a draw command generator for generating draw commands; a stream comparator for determining whether said draw commands are required to be sent to said client device; a choreographer for determining whether a length of a draw command queue of said draw commands to be sent to said client device exceeds a threshold value; and a window compositor for managing at least one window's behavior at said client device.

Yet another aspect of the invention is directed to a client device comprising: a processor for interpreting or executing machine-readable instructions including draw command instructions, wherein some of said draw command instructions are retrieved from on board said client device and others are retrieved from a server over a communication link to said client device; a data storage unit including addressable memory locations for caching a plurality of draw commands; a data storage unit including addressable memory locations for caching a plurality of display data; a sensor for sensing a user input; an input event generator for generating input event signals corresponding to an output of said sensor; a velocity tracker for determining an input event signal velocity of said input event signals; and a display unit receiving signals from said processor responsive to said draw commands and to said display data.

Another aspect of the invention is directed to a method for controlling a display of a client device. The method comprises, in said client device: sensing a user input corresponding to a desired display state of said display; generating user input events corresponding to said user input; determining if a rate of said user input events exceeds a threshold rate; reducing a number of said user input events when said rate of said user input events exceeds said threshold rate; and sending said reduced number of said user input events to a server when said rate of said user input events exceeds said threshold rate.

BRIEF DESCRIPTION OF THE DRAWINGS

For a fuller understanding of the nature and advantages of the present concepts, reference is made to the following detailed description of preferred embodiments and in connection with the accompanying drawings, in which:

FIG. 7 illustrates an exemplary summary log of draw commands;

DETAILED DESCRIPTION

Aspects of this disclosure are directed to server-client systems existing over a communication network, for example, in the interactions between servers and client devices communicating therewith in the context of cloud platforms and applications. More particularly, the present systems and methods can be implemented in mobile or personal communication and computing devices such as tablets, smartphones and the like.

As mentioned above, typical personal communication or computing devices suffer from a limited communication bandwidth as well as limited computing resources. The limited computing resources may include limited graphics processing and limited storage (memory) resources as well as limited communication resources. Therefore, in modern systems, there may not be sufficient communication or computing resources in a connected device to allow it to quickly receive and render graphical information on a display in the device. This is especially true for graphics-intensive applications such as games and mapping and similar applications where the client device and/or the server must generate and deliver and render large amounts of display data for the client device. The end result of such limitations are a degraded user experience, which can at a minimum detract from the user's satisfaction with the device or application, and at worst can result in the device being unable to execute the needed steps to generate the graphical output required, including crashing or freezing or causing other symptoms of inoperability of the client or the server-client systems.

Embodiments of the present disclosure permit the operation of relatively limited client devices (e.g., for client devices in high security applications where minimal data can be stored thereon) so that they can give the rich experience of a client machine with fuller communication and/or computing capabilities. In some aspects, the present disclosure permits a fast virtual desktop experience not possible using conventional techniques. As described above, where conventional systems required the delivery of display data at a given frame rate that was potentially costly or unsupportable, this disclosure relieves this situation by proper control and management of display data in and between the server and the client.

Figure 1:
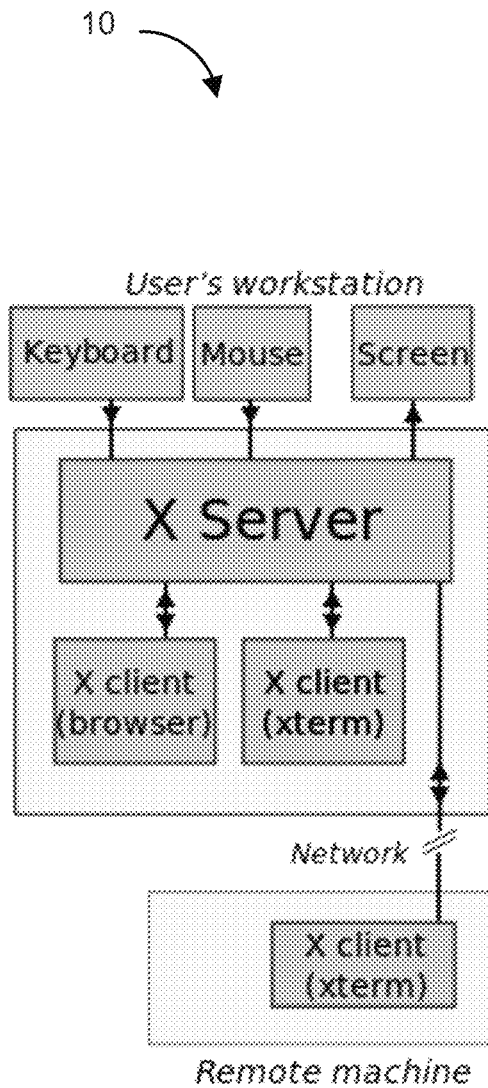
FIGS. 1 and 2 illustrate an exemplary architecture and GUI output, respectively, using a system (X Windows) for generating graphical output on a client computer according to the prior art.
Figure 2:
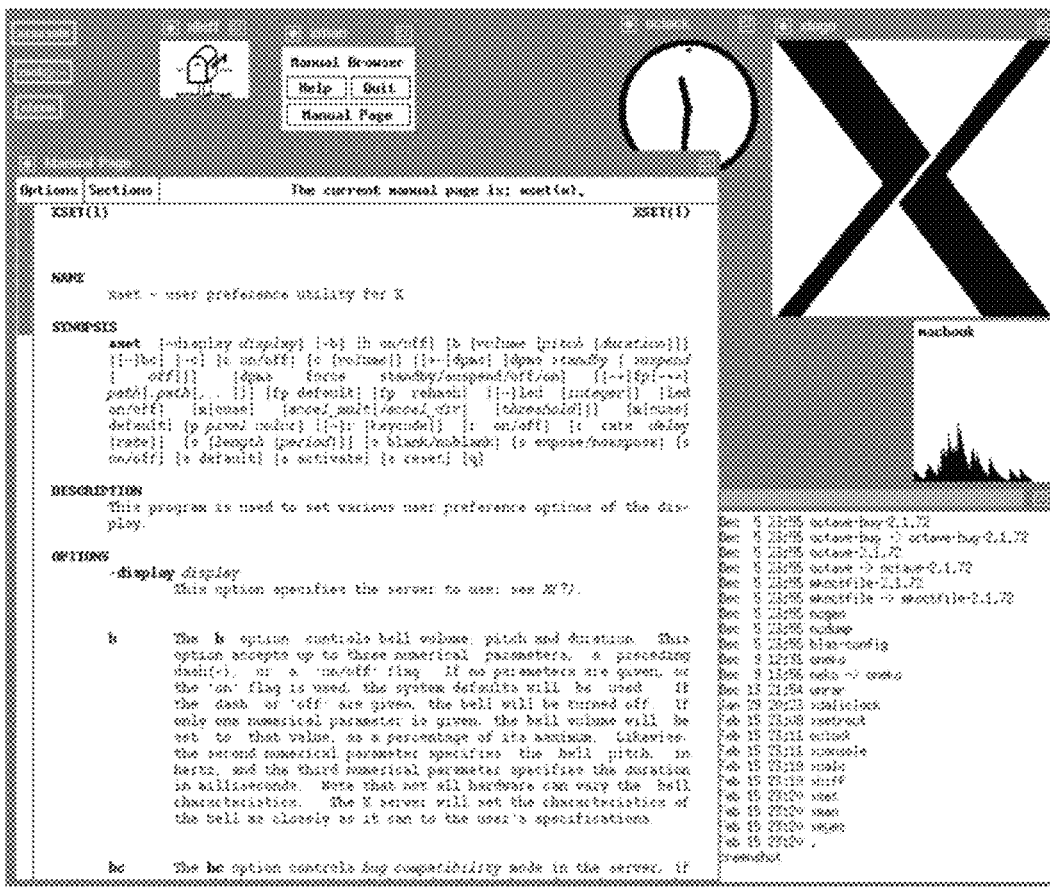
Figure 3:
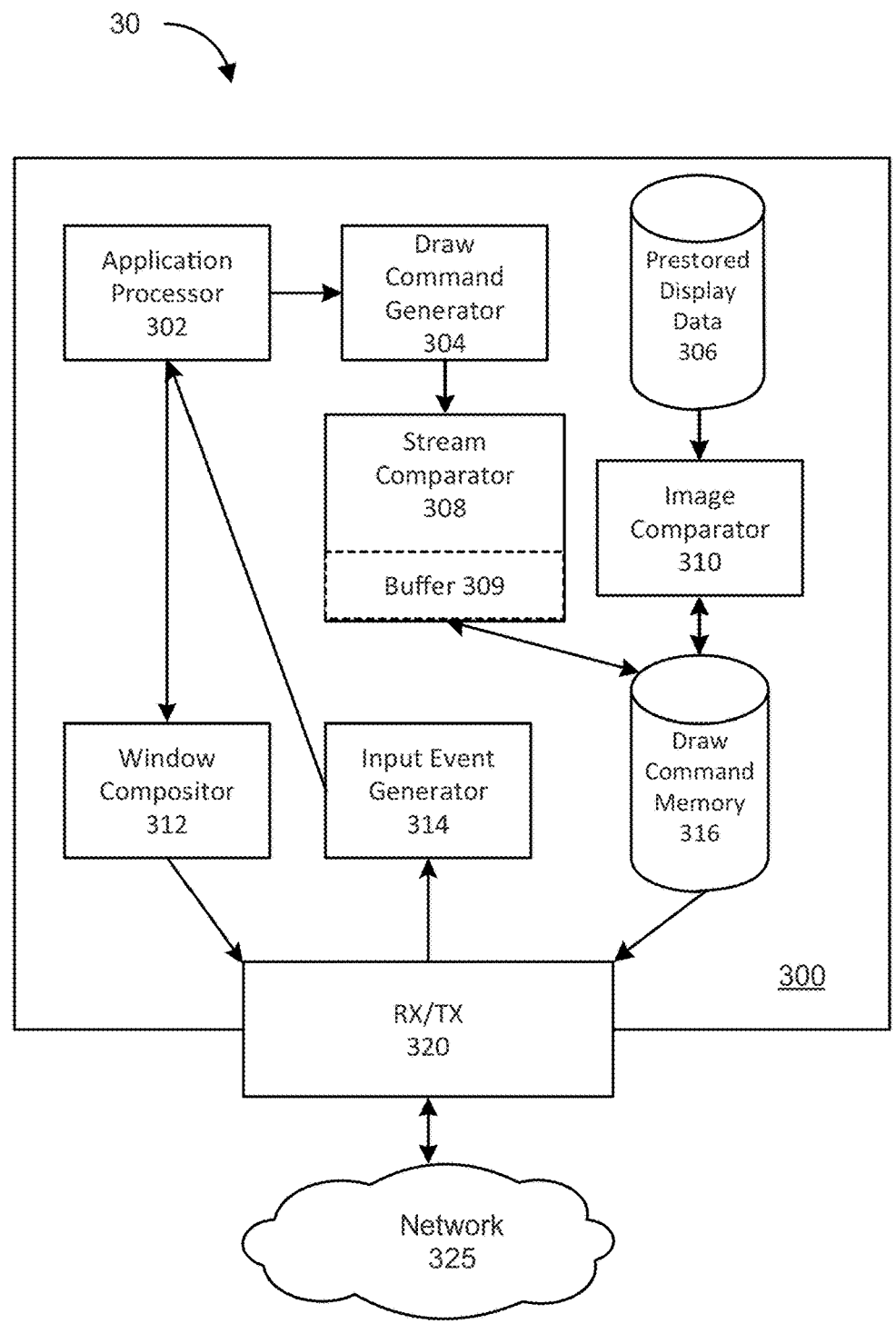
FIG. 3 illustrates an exemplary block diagram of a network-connected server.

FIG. 3 illustrates a block diagram of an architecture 30 for use in some embodiments of the present system and method. The figure shows the server 300 side of things, while the server 300 is connectable through a network 325 to client devices (e.g., client device 400 and/or client device 900), described herein.

Server 300 includes an application processor 302, which can take on many forms in practice. The processor 302 can be a monolithic integrated circuit (IC) processor device with a processor core and auxiliary functions including on-chip memory, cache, controllers, power management, buswork and other features. Also, the functionality of application processor 302 can be distributed among more than one physical component interacting over an internal or external signal communication pathway such as a digital signaling bus or multi-bit bus system. The processor 302 is capable of taking and interpreting or executing instructions and instruction sets as necessary. It can support the running of an operating system on server 300 and also execute application programs and generally control the operation of server 300. This processor can be merely a process sufficiently enabled for the present functionality in a greater circuit or computer hardware component without loss of generality.

As mentioned above, server 300 is connectable to a network 325, e.g. a LAN, WAN, or the Internet through a receive/transmit (RX/TX) connection 320 or other suitable network connection plug. Various information such as control and signaling communication data and payload data can be exchanged through RX/TX connection 320. The communication may be packetized in common communication protocol packets including header and payload bits, and the physical format can be in any acceptable form including hard-wired or wireless communication formats.

The server receives input event data over the communication links to an input event generator 314. This interprets the intentions or inputs of a user of a client device in communication with server 300. For example, this module determines if the client device is executing a user interface process such as clicking, touching, dragging, swiping or another touch-based, visual or audible input from a user. The output of the input event generator 314 is used by the application processor 302 to determine what data is needed by the connected client device.

Application processor 302 provides signals to draw command generator 304 so as to generate data to provide the client device with virtual events displayed on the client. The input event generator 314 also receives information from the connected client device through connection 320 and aids the system to generate activity corresponding to the needs of the user of the client device in cooperation with sensors on the client device that sense the needs and actions of the client device's user.

Draw command generator 304 generates instructions in a format usable for controlling the display activity at a connected client device. The draw commands are generated responsive to signals received by draw command generator 304 from application processor 302 and other factors as described herein.

A prestored display data storage unit 306 is included on or associated with server 300 and holds display data for use by the connected client device. The display data may be graphical in nature or alphanumeric or in any format suitable for transmission to the client device to achieve a display thereon. Also, the display data may be compressed or reformatted or contain a shortcut or abbreviation or other digital representation corresponding to a displayable thing. The physical configuration of the device on which the display data are stored can vary, but it is typically a computer-readable memory device, and may have primary and secondary or optimized storage layouts to improve its performance.

Draw commands generated by draw command generator 304 are stored in draw command memory 316, which can physically be in a same or separate data storage unit than the others discussed herein. Draw commands include machine-readable or human-readable commands encoding what and how to display the display data on the connected client device. Draw commands can be delivered from the draw command memory 316 over the network 325 to connected client devices. Examples of draw commands are given below as illustrations of how the server and client device work together to maximize the speed and efficiency of the transfer of data between them to generate the desired client display.

Other components residing on server 300 include an image comparator 310 to assess the existence and redundancy of image data and avoid re-transmission of the same. Image comparator 310 will compare images to be sent to a client device with the contents of the prestored display data in memory 306. If a match is found, it will try to locate this image in the draw command memory 316. If it finds a match, it will replace image data with a special draw command (e.g. 97) and a prestored image identifier. The special command will indicate that a prestored image was found.

A window compositor 312 acts to control and compose windows in graphical user interface screens presented on a client device display.

A stream comparator 308 is used to determine what information needs to be carried in the draw command and display data streams being sent from the server to the client device. Older commands will be stored in draw command memory 316. The stream of new draw commands is provided to the stream comparator 308. In an embodiment, new instructions entered to the comparator 308 are compared with the old commands stored in memory 316. If a match of both the command code and data is found, then a pointer with the address different from the matched command will be generated. For example, if there is a command 560 and a match to command 42 is found, the difference is 518. A special command code will then be generated (this will be an unused code) for example 99, and it will indicate that a matched command was found. Therefore, if the original instruction had command code 10 with 142 bytes of data, command 99 with a value of 518 will be entered, and hence 3 bytes will be used instead of 143.

In another embodiment, the stream comparator 308 may contain a buffer 309 holding a certain number of draw commands, for example eight (8) draw commands. When a draw command reaches the end of buffer 309, the comparator 308 will check for a match for a block of eight draw commands. If there is no match the comparator will check for a match for seven draw commands and so on, until only one draw command is being compared. Where a match of more than one draw command is found, the difference value is generated and stored as a special command code, the difference value and the number of commands. The special command code (e.g. 98) will indicate that a matched instruction sequence was found. In our example, it will store 98, 518 and 4. These will be 4 bytes instead of 570 bytes. The new command will replace the sequence of commands (e.g. 4 commands) for which the match was found. In a connected client device, a similar draw command memory is kept, as will be explained below, and a client device command interpreter will recognize that this is a special instruction and will fetch from its own draw command memory the appropriate draw command sequence.

In another embodiment, the stream comparator 308 will also search for data embedded in the draw commands, e.g. for a text box, and will search for the same data in the prestored display data memory 306. Then, instead of delivering a copy of the found display data a special command code is inserted into the stream indicative of the distance from the matched data and the data length in bytes. Display data typically has a screen location identifier, which will be unique to each instance of this data (e.g., a text box). The stream comparator 308 can therefore identify the unique portion and generate an indication on the portions with the same data.

In another embodiment, the stream comparator 308 determines that draw commands representing an image or object have been sent to the client device and the input event corresponds to a manipulation of the image or object. In this case, the stream comparator 308 determines that the draw commands representing the image or object have already been sent to the client device and inserts a special command code and a prestored image identifier corresponding to the image or object already sent to the client device. The stream comparator 308 also inserts the draw commands that correspond to the requested manipulation of the image or object. Examples of such manipulation include zooming, rotating, translating, and skewing (e.g., enlarging or shrinking the object in the vertical and/or horizontal directions) the image. Other examples, as understood in the art, are also contemplated.

In a specific example, the input event corresponds to the user zooming in on an object and the stream comparator 308 inserts (a) a special command and a prestored image identifier corresponding to the object and (b) a new draw command (or sequence of draw commands) that directs the user device to zoom in on the requested portion of the object. In another specific example, the input event corresponds to the user rotating an object and the stream comparator 308 inserts (a) a special command and a prestored image identifier corresponding to the object and (b) a new draw command (or sequence of draw commands) that directs the user device to perform the requested rotation of the object. In another specific example, the input event corresponds to the user translating the object from a first position to a second position on the user device screen and the stream comparator 308 inserts (a) a special command and a prestored image identifier corresponding to the object and (b) a new draw command (or sequence of draw commands) that directs the user device to translate the object to the second position. In another specific example, the input event corresponds to the user skewing the object by enlarging the object from a first set of coordinates on the user device screen to a second set of coordinates on the user device screen and the stream comparator 308 inserts (a) a special command and a prestored image identifier corresponding to the object and (b) a new draw command (or sequence of draw commands) that enlarges the object to the second set of coordinates on the user device screen. Of course, the foregoing examples are merely illustrative and those skilled in the art will appreciate other embodiments and examples.

It should be understood that the components shown and described can be reconfigured by those skilled in the art according to their needs. That is, some of the described components may be functionally grouped or further split up. Also, these units may be located in separate places associated with or accessible by server 300, or may be co-located on the server itself as shown for simplicity. Finally, these things may be designed to use hardware, firmware or software to varying extents, and those skilled in the art can appreciate the ability to shift some functions for example between hardware and software without loss of generality.

Figure 4:
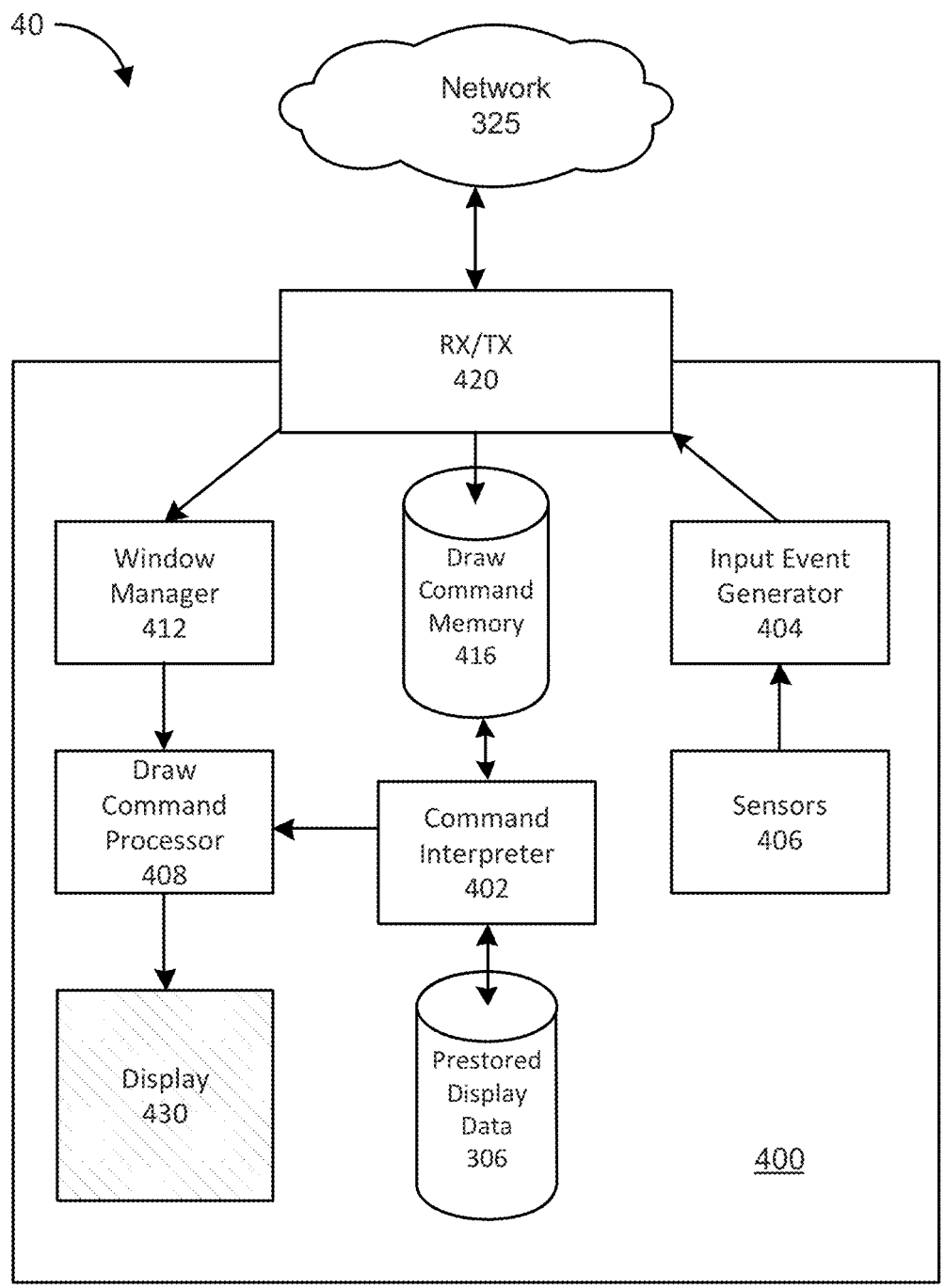
FIG. 4 illustrates an exemplary block diagram of a network-connected client with a display.

FIG. 4 illustrates an exemplary architecture 40 of a connected client device 400 with blocks representing components or functional units for operation according to the present disclosure. The client device 400 may be any computing device suitable for the present purpose. Examples are portable electronic devices, communication devices, tablets, smartphones, personal digital assistants, e-reader devices, navigation units, music players, and so on.

Client device 400 typically includes several computing resources as known generally in the field. For example, whether or not discussed in detail here, client device 400 may contain one or more processors for executing machine-readable instructions, one or more digital data storage units, cache memories, network connectivity, and a display unit.

Client device 400 is coupled by a receive/transmit connection 420 to network 325, which may be the aforementioned LAN, WAN, Internet, or other wired or wireless network. Client device 400 receives draw commands from the server 300 over network 325 and these are deposited in draw command memory 416. Also, display data and images and graphical content and files are received and stored in prestored display data unit 306. It is noted that client device 400 can also be coupled to server 800, described below.

Command interpreter 402 interprets the received draw commands and delivers an output to draw command processor 408, which can be implemented in a processing circuit. The draw command processor 408 may carry out executable or interpreted instructions. Draw command processor 408 also receives input from a window manager 412 to control the behavior of one or more graphical windows to be displayed on display 430.

Display 430 may be any of a number of display types, usually integrated into the body of a mobile or personal device such as a smart phone, but those skilled in the art understand that this can be generalized beyond the present examples. The display 430 may comprise a liquid crystal display (LCD) panel, a light emitting diode (LED) display, plasma display, cathode ray tube (CRT) display, e-ink display, or any other kind of display suitable for a given purpose.

As known to those skilled in the art, display devices typically comprise rows and columns of addressable picture elements (pixels) that are illuminated by display specific driving signals. The driving signals are delivered to the appropriate color and address of respective pixels to cause the overall display to present the desired content. The display 430 is usually refreshed at some refresh frame rate, and can therefore also provide the notion of animation or movement of an image such as a video segment. The import of this is not necessarily in the specific design of a given display, as the present disclosure can be generalized to any kind of display. Rather, that the draw command processor 408 or equivalent graphics hardware and software (usually integrated in an operating system on the device) put up one or more windows of content that are managed by window manager 412 and draw command processor 408. Various GUI elements, graphical elements and drawing primitives can be placed onto display 430. The client device and its operating system may come with a number of such drawing methods, elements and primitives already loaded thereon. These are rendered among the other display data from prestored display data unit 306.

It is worth repeating that the draw commands and the display data are put into local cache memory in the client device according to an aspect. So if a graphical element (e.g., a picture or an icon) is to be reused on the client to draw this same element to the client's display, there is no need to re-send this from the server to the client device, which consumes too much communication and computing resources. The client can sort and prioritize how and what it places into cache to achieve maximum performance gains. In an aspect, more commonly used data is placed in the fastest most readily accessible cache. In another aspect, the fastest most recently used data is cached in the most readily accessible cache. In yet another aspect the server 300 can inform the client 400 through some control command which data to place into its cache.

The server and the client architectures 30 and 40 shown in FIGS. 3 and 4 respectively are connected over some network 325 as mentioned above. The server 300 may act to support a number of clients 400, not just one. The server 300 may thus be a multi-processor or multi-threaded machine with instances running thereon to support a scalable architecture as described herein. The present system and method can support different types of client devices and different operating systems on the clients. There are known interfaces and tools allowing the server 300 to generically deliver display data and draw command data to the clients, and the clients are then able to transform or interpret the commands, e.g., in command interpreter 402 to suit their specific configurations.

The following instructions encode a series of commands to be generated by server 300 and interpreted for display in client device 400. Many other such commands and parameters therefor are possible and can be created by the programmer according to the present method. This example is therefore only given for the sake of illustration:

```
'bytesCount' : 71,
'processId' : 18311,
'cmdcode' : 16,
'cmdName' : 'setDensity',
'wndId' : −1625598408,
'bm' : {
    'canRead' : true,
    'bounds' : {
        'canRead' : true,
        'isNull' : false,
        'left' : 636,
        'top' : 17,
        'right' : 760,
        'bottom' : 141 },
    'matrix' : {
    'canRead' : true,
    'isNull' : false,
    'arr' : [ 1,0,0,0,1,0,0,0,1 ]}},
'density' : 132
```

It is noted that a group of commands such as those given above may be generated and delivered to the client device in bulk or as a set of instructions relating to one another. Here, the draw commands include a "bytesCount" command indicative of a number of bytes carried in the command. A "processId" identifies a connection process with which the command is associated. A command code can be given by its "cmdcode". The command may also have a common name "cmdName", and many other commands. The ones shown are, again, only exemplary for a type of operation being carried out by the systems.

It is also noted that a "matrix" can be included in the draw command set. The matrix carries information about the attributes of an object. For example, "canRead" or "isNull" (which may have Boolean values), or an array "arr" of attributes or parameters or arguments as well.

Another exemplary set of draw command instructions is shown below, which illustrates the flexibility of the present method and system, which lends itself to scripting of this nature as necessary to communicate to the client device how and what to present on the client device display.

```
'bytesCount' : 107,
'processId' : 18311,
'cmdcode' : 6,
'cmdName' : 'drawText1',
'wndId' : −1625598408,
'bm' : {
    'canRead' : true,
    'bounds' : {
        'canRead' : true,
        'isNull' : false,
        'left' : −2,
        'top' : −65,
        'right' : 102,
        'bottom' : 49 },
    'matrix' : {
        'canRead' : true,
        'isNull' : false,
        'arr' : [ 1,0,648,0,1,92,0,0,1 ]}},
'text' : 'Settings',
'start' : 0,
'x' : 28,
'y' : 13,
'paint' : {
    'flags' : 257,
    'antiAlias' : true,
```

-continued

```
'filterBitmap' : false,
'dither' : false,
'underlineText' : false,
'strikeThruText' : false,
'fakeBoldText' : false,
'linearText' : false,
'subpixelText' : false,
'style' : 0,
'strokeCap' : 0,
'strokeJoin' : 0,
'textAlign' : 0,
'hinting' : 1,
'pdMode' : 31,
'textSize' : 12,
'strokeWidth' : 0,
'color' : 16777215,
'alpha' : 255,
'textScaleX' : 1,
'textSkewX' : 0 }
```

It is noted that the commands can include instructions regarding the placement of a graphic or drawn object, as well as its drawing style, font selection, color, as well as other information.

A log may be kept on the server or at another place which tracks the display commands sent to the client device, including the command codes, bytes of information contained in the command and/or payload, and so on. An exemplary log of such transmitted commands is presented below merely as an example of course. Those skilled in the art would appreciate the significance of such logs for example in tracking performance metrics of the system or other aspects of its operation, billing, user behavior, and so on.

Figure 5:
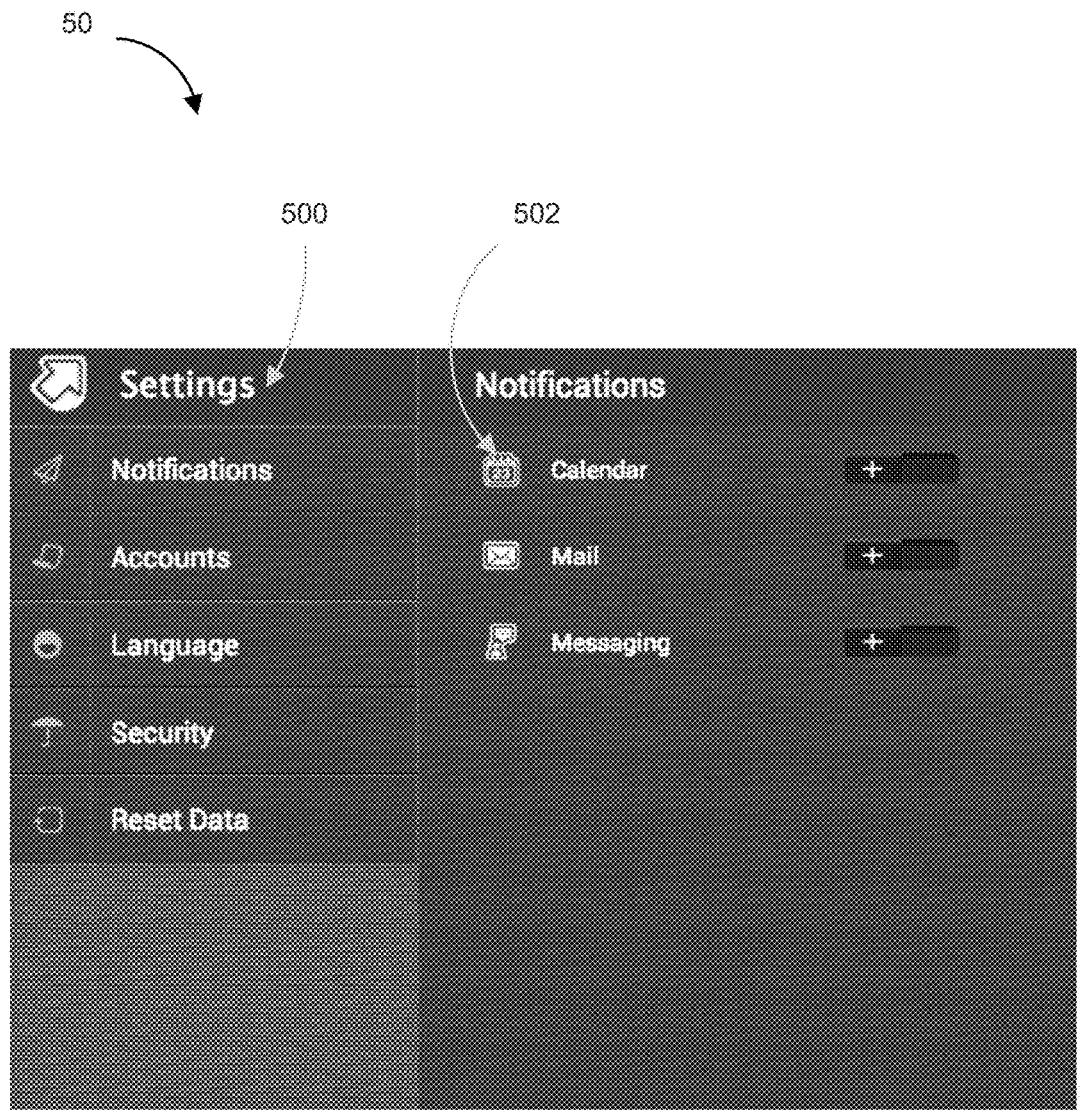
FIGS. 5 and 6 illustrate exemplary display states of some application virtually presented on the client device.

FIG. 5 illustrates an exemplary display of a virtual desktop space 50 on a client device according to this disclosure. A number of divided areas can be assigned on the overall area of the display 430 or windows thereof. For example, an application such as a to-do list application can be running on the server 300 and can cause the delivery of display data and draw commands to the client device to show the output seen in FIG. 5. Text characters 500 can be displayed at given places and in given ways on the screen. Icons, pictures or other graphical information 502 can be displayed and arranged on the display screen as well.

Figure 6:
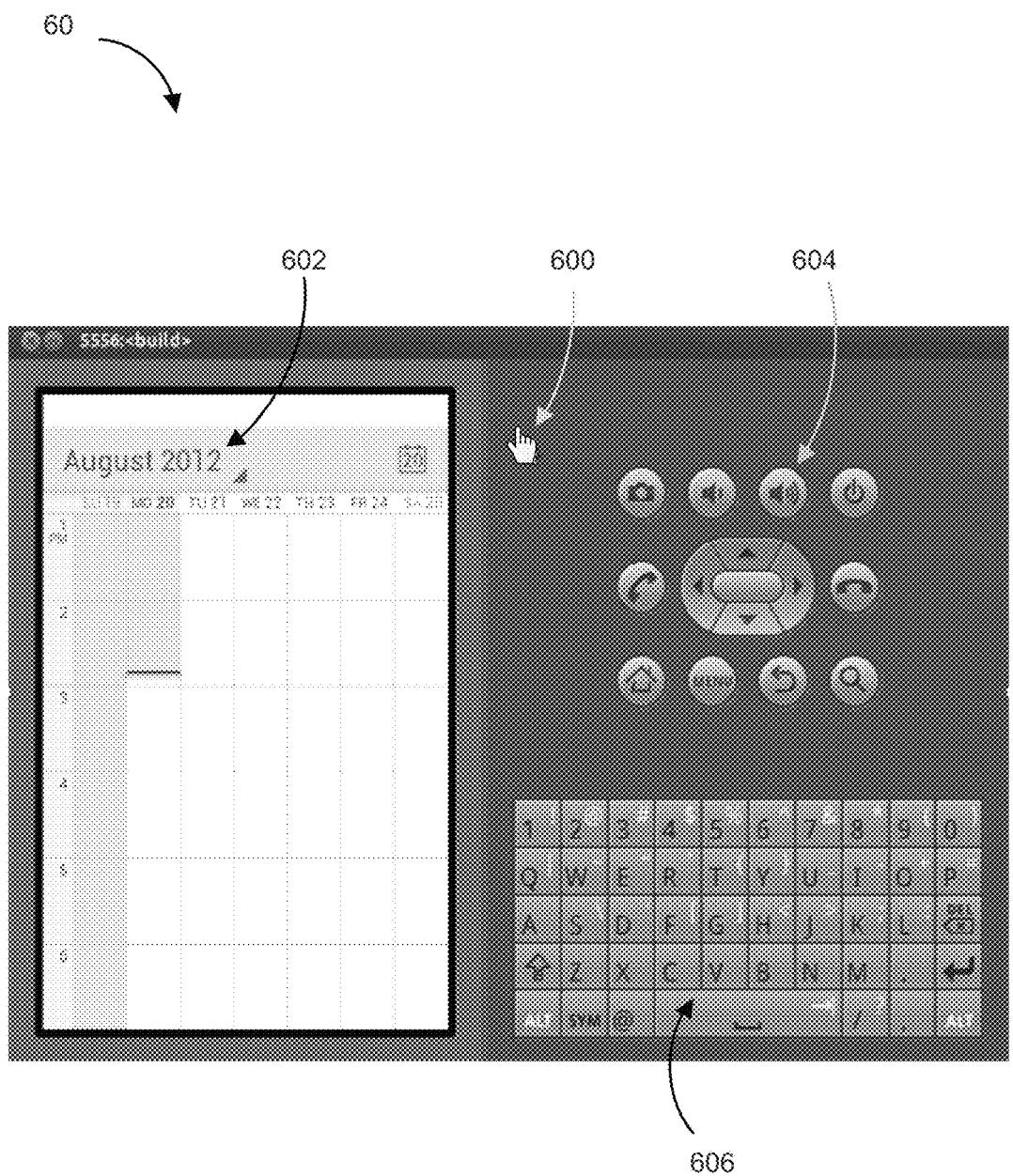

FIG. 6 illustrates another exemplary display output 60 on a client device. A GUI in a window allows a user though a cursor 600 or using other input methods such as touch, voice or gestures to interact with the client device through its screen. A calendar application shown here displays numbers and graphical elements 602 as desired, and offers interactive virtual buttons and GUI features 604, an interactive virtual keyboard 606, and so on. The user can interact with the virtual desktop 60 and cause the application to behave as if it were running locally on the client device. Sensors 406, shown in FIG. 4, take the input from the user such as touch inputs or audio command inputs. The sensors 406 cause input event generator 404 to encode the user's inputs in a way that can be sent in real time to the server 300 over network 325. In an exemplary implementation, the total bandwidth required to transfer the draw commands for displaying the screen of FIG. 6 is around 120 kB, which represents a five-fold speedup from what would be required to send this graphical output from the server to the client device conventionally using image streaming techniques.

FIG. 7 illustrates an exemplary summary or log of a stream of draw commands 70. These do not show the full payloads of the streaming packets, but are indicative of the continuing delivery of commands from the server to the connected client device so as to achieve the present goals.

Figure 8:
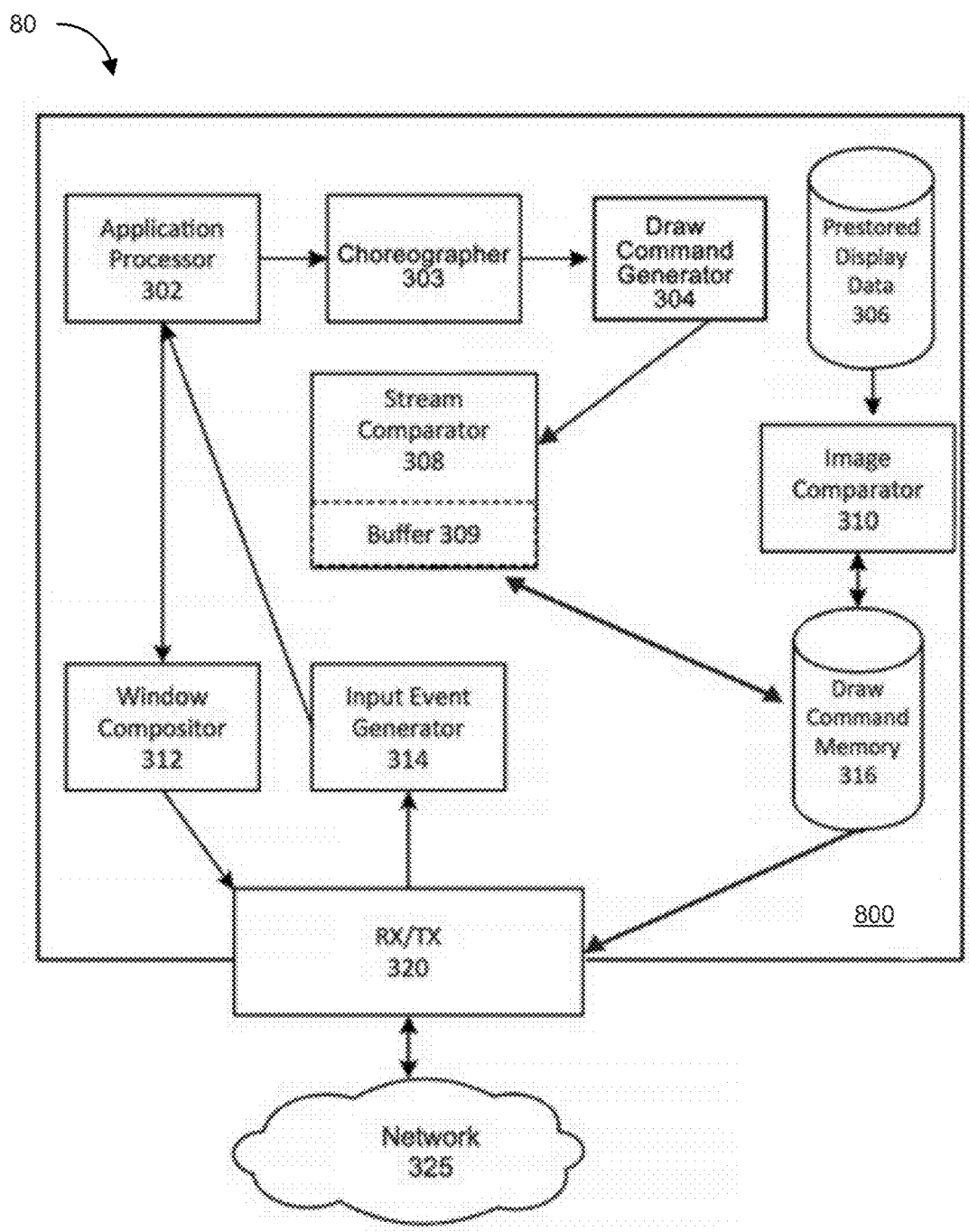
FIG. 8 illustrates a block diagram of an architecture of a server according to one or more embodiments.

FIG. 8 illustrates a block diagram of an architecture 80 of a server 800 for use in one or more embodiments of the present system and method. Server 800 is illustrated with blocks representing components or functional units for operation as described herein. As illustrated, server 800 is connectable through a network 325 to client device 400 and/or 900, illustrated in FIGS. 4 and 9, respectively. Server 800 includes the same or similar components to server 300 in addition to a new component called choreographer 303, which is in communication with application processor 302 and draw command generator 304. For brevity, the other components are not described with respect to FIG. 8, except as necessary to choreographer 303.

As discussed above, the display on the client device is updated based on display data received from the server 300, 800. The display data can include new draw commands and/or new sequences of draw commands, which were not previously sent to the client device. If at least a portion of the draw commands were previously sent to the client device, the server 300, 800 can send special draw commands and prestored image identifiers that point the client device to the previously-sent draw commands stored in the client's cache memory (or other memory location).

As discussed, the draw commands are generated in response to input events at the client device. Examples of such input events include a user touching, tapping, swiping, dragging, or other gesture using a touch screen on the client device. An additional example of an input event can include a visual or audible input from a user. Another example of an input event can include a user's input on a peripheral device, such as a keyboard, a mouse, a camera, or other device. Yet another example of an input event can be from an internal component of the client device, such as an accelerometer (e.g., a MEMS) or a GPS circuit, or from data received by the client device, either from internal memory of the client device or from a network.

The input events are transmitted by the client device over network 325 to the server 300, 800, where they are received at RX/TX 320. The input events are then transmitted to input event generator 314, which interprets the inputs or intentions of the user. The output of the input event generator 314 is used by the application processor 302 to determine what display data (e.g., draw commands or sequence of draw commands) is needed by the client device. The draw commands and/or special commands (and prestored image identifiers) are generated and transmitted to the client device via RX/TX 320 and network 325, as described above.

In addition to the input events, RX/TX 320 transmits to the processor 302, via input event generator 314, data representing the number of commands (new draw commands, special commands, and prestored image identifiers) in queue at RX/TX (or cache) to send to the client device. The volume of draw commands in the queue can vary according to the number of input events and the quality of the connection to network 325 (e.g., bandwidth) of server 800 and the client device. For example, fi server 800 has a poor connection to the network 325 and cannot keep up with the volume of commands to send to the client device, the commands may accumulate at RX/TX 320 and/or the cache of the server 800, resulting in a queue of commands at the server 800 to be transmitted to the client device.

If the processor 302 or RX/TX 320 determines that the number of commands in queue is greater than a maximum acceptable number, such as a threshold number, RX/TX 320 sends a signal to the choreographer 303, via input event generator 314 and processor 302. The choreographer 303 receives the signal and generates a new signal or command to draw command generator 304 that causes the draw command generator 304 to reduce the number of new draw commands generated. For example, if the user input is a swipe across the screen to change the orientation of an object, the draw command generator 304 can reduce the number of draw commands by making the change in orientation of the object appear more "coarse," such as by decreasing the number of intermediate orientations of the object. As a specific example, if the user's input corresponds to changing the object's orientation by 45 degrees, the draw command generator can reduce the number of draw commands by displaying 9 intermediate orientations, each offset by 5 degrees, instead of 45 intermediate orientations, each offset by 1 degree. As can be seen, the reduction in draw commands accounts for the reduced bandwidth by making the orientation change appear more "coarse" to the user. However, in other examples the reduction in draw commands may not be noticeable to the user. For example, a user may quickly move an object across the screen and a reduction in the number of the object's intermediate locations displayed on the device (e.g., a decrease from 100 intermediate locations to 25 intermediate locations) may not be noticeable or relevant to the user. Of course, the foregoing examples are merely illustrative and those skilled in the art will appreciate other embodiments and examples.

In some embodiments, server 800 (e.g., application processor 302 and/or RX/TX 320) determines the number of draw commands in queue at any given time by comparing the number of draw commands generated by draw command generator 304 with the number of draw command acknowledgments received from the client device. The client device can generate and send to server 800 a draw command acknowledgment for every draw command or sequence of draw commands that it receives. The number of draw commands in queue is the difference between the number of draw commands generated and the number of draw commands acknowledgments received. The data (e.g., number of draw commands generated and number of draw command acknowledgments received) for determining the number of draw commands in queue can be evaluated based on a predetermined or arbitrary start time. Alternatively, the data can be evaluated over a rolling time window, such as within the past 1 to 10 seconds, such as within the past 2 seconds, 4 seconds, 5 seconds, 6 seconds, 8 seconds, or any value or range there between. The rolling time window can also be less than one second, such as a half second or a quarter second. Using a rolling time window can provide a consistent time period for measuring the number of draw commands in queue, can reduce the processing power needed to perform the calculations, and/or can eliminate irrelevant data (e.g., it is unlikely that a draw command generated 5 minutes ago is relevant since it is highly likely that the client device already received and acknowledged this draw command).

In some embodiments, server 800 (e.g., application processor 302 and/or RX/TX 320) determines if the number of draw commands in queue is above a first threshold number (e.g., a maximum acceptable draw command queue length). or below a second threshold number (e.g., a minimum acceptable draw command queue length). When the number of draw commands in queue is above the first threshold number, server 800 (via choreographer 303) can decrease the rate of new draw commands generated by draw command generator 304. When the number of draw commands in queue is below the second threshold number, server 800

(via choreographer 303) can increase the rate of new draw commands generated by draw command generator 304. In some embodiments, server 800 maintains the rate of new draw commands generated by draw command generator 304 when the number of draw commands is between the first threshold number and the second threshold number.

In addition or in the alternative, server 800 (e.g., application processor 302 and/or RX/TX 320) determines a measured acknowledgment rate (or percentage) of draw commands from the client device and adjusts the rate of new draw commands generated if the acknowledgement rate falls below a first acknowledgement rate threshold (e.g., a minimum acceptable acknowledgement rate). The measured acknowledgement rate can be determined by dividing the number of draw commands acknowledgments received by the number of draw commands generated. As with the number of draw commands in queue, the data (e.g., number of draw commands generated and number of draw command acknowledgments received) for determining the measured acknowledgment rate (or percentage) can be evaluated from a predetermined or arbitrary start time or over a rolling time window, as discussed above. If the measured acknowledgment rate (or percentage) of draw commands falls below a first threshold acknowledgment rate, which can be a predetermined acknowledgment rate such as about 75% to about 95%, including about 80%, about 85%, about 90%, or any value or range there between, RX/TX 320 can send a signal to choreographer 303 that informs or commands choreographer 303 to generate a new signal or command to draw command generator 304 to reduce the number of new draw commands generated, as discussed above.

In some embodiments, server 800 (e.g., application processor 302 and/or RX/TX 320) compares the measured acknowledgement rate with a second threshold acknowledgment rate. If the measured acknowledgement rate exceeds the second threshold acknowledgment rate, server 800 can increase the rate of new draw commands generated by draw command generator 304. The second threshold acknowledgment rate can be the same or different than the first threshold acknowledgment rate. In some embodiments, the second threshold acknowledgment rate is higher (e.g., 95% to 98%) than the first threshold acknowledgment rate (e.g., 85%). In a specific example, server 800 decreases the rate of new draw commands generated when the measured acknowledgment rate falls below the first threshold acknowledgment rate (e.g., 85%) and then increases the rate of new draw commands generated when the measured acknowledgment rate exceeds the second threshold acknowledgment rate (e.g., 98%). In another example, server 800 maintains the rate of new draw commands generated when the measured acknowledgment rate falls between the first threshold acknowledgment rate and the second threshold acknowledgment rate, and then decreases or increases the rate of new draw commands generated depending on whether the measured acknowledgment rate falls below the first threshold acknowledgment rate or exceeds the second threshold acknowledgment rate, respectively.

Figure 9:
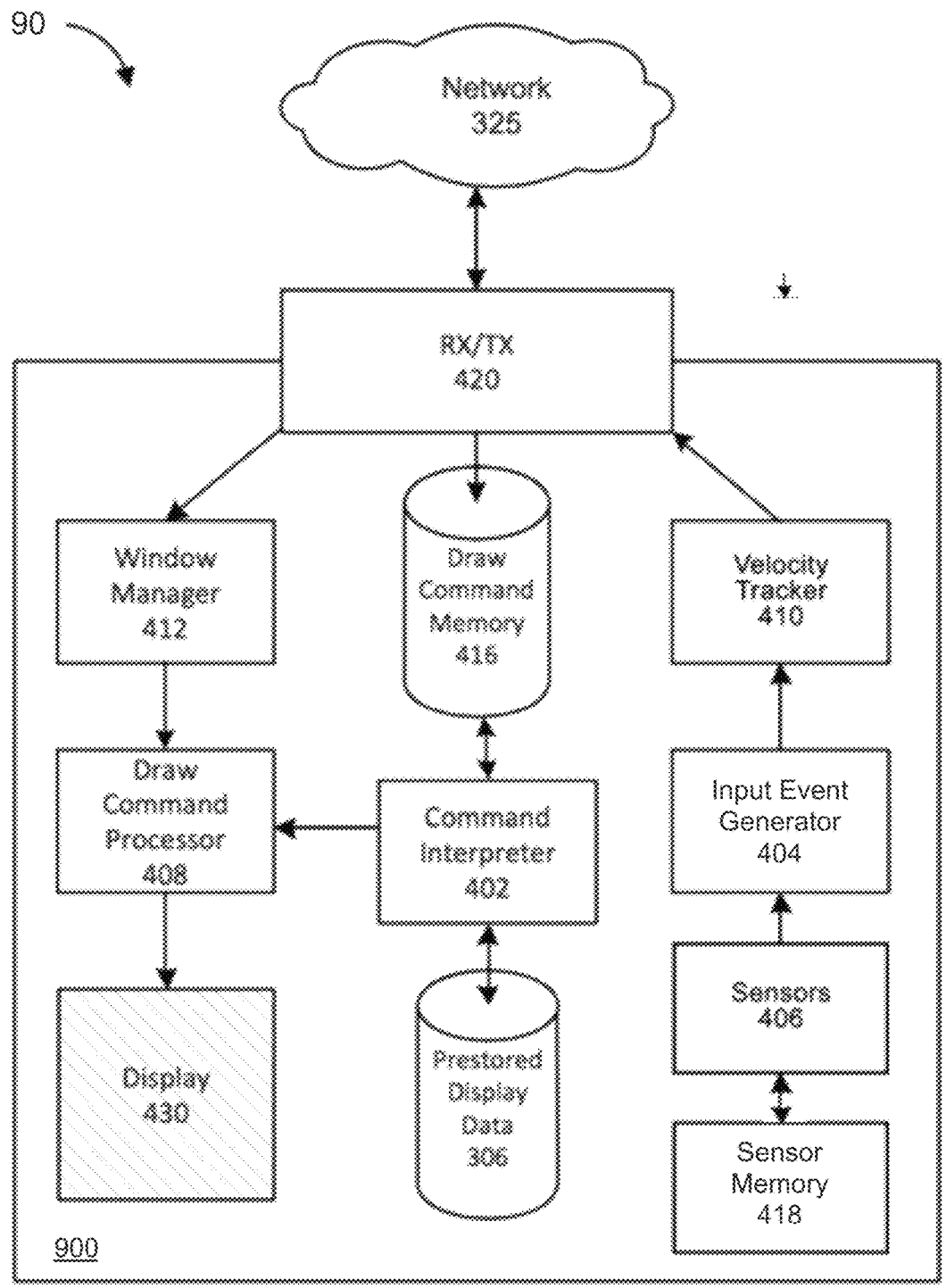
FIG. 9 illustrates an exemplary architecture of a connected client device with blocks representing components or functional units for operation according to one or more embodiments.

FIG. 9 illustrates an exemplary architecture 90 of a connected client device 900 with blocks representing components or functional units for operation according to one or more embodiments. As illustrated, client device 900 is connectable through network 325 to a server, such as server 300 and/or server 800 described above. Client device 900 includes the same or similar components to client device 400 in addition to two new components: velocity tracker 410 and sensor memory 418. For brevity, the other components are not described with respect to FIG. 9, except as necessary to describe velocity tracker 410 and sensor memory 416. While client device 900 is described as including both velocity tracker 410 and sensor memory 416, in some embodiment the client device includes only one of those components (i.e., either velocity tracker 410 or sensor memory 416)

As described above, sensors 406 sense the input from the user, such as touch inputs or audio command inputs. The sensors 406 cause input event generator 404 to encode the user's inputs as input events in a way that can be sent in real time to the server over network 325. The input events are sent from input event generator 404 to network via velocity tracker 410 and RX/TX 420. Velocity tracker 410 monitors the rate or "velocity" of input events sent from input event generator and determines whether the velocity exceeds a maximum acceptable velocity or threshold velocity (in general, the threshold velocity). If the input event velocity exceeds a predetermined threshold velocity, velocity tracker 410 decreases the number of input events sent to the server, via RX/TX 420 and network 325. In some embodiments, velocity tracker 410 decreases the number of input events sent to the server when the input event velocity exceeds a percentage of the predetermined threshold velocity (e.g., if the input event velocity exceeds the predetermined threshold velocity by 10%, 15%, 20%, or any value or range there between).

For example, sensor 406 senses that the user has moved an object across the touchscreen in a swipe motion (or by clicking and moving a mouse in a device that includes conventional screen). The output of sensors 406 includes all or substantially all of the coordinates of the user's finger as it swipes across the touchscreen. If the swipe occurs quickly (e.g., in half a second), the large number of coordinates (e.g., 500) in the short time frame results in a high velocity of input events (e.g., the equivalent of 1,000 input events per second) output by input event generator 404. In response, the velocity tracker 410 determines that 1,000 input events per second is greater than the threshold velocity (e.g., 100 input events per second), or greater than a percentage of the threshold velocity, and causes a decrease in the number of input events transmitted to the server (via RX/TX 420 and network 325), thereby causing a decrease in input event velocity. In a specific example, the velocity tracker 410 reduces the number of input events to cause the input event velocity to be less than or equal to the threshold velocity (e.g., 100 input events per second in the previous example). Velocity tracker 410 can accomplish this by reducing the sampling rate of input events, for example so that the coordinates of the user's swipe is determined every hundredth of a second instead of every thousandth of a second, resulting in a tenfold decrease in the number and velocity of input events. As a result, the server generates and transmits fewer draw commands to client device 900, resulting in the depiction of fewer intermediate positions (e.g., 10 intermediate positions instead of 100) of the objected as it moves across the screen (or other manipulations of the object). The threshold velocity can be selected so that the decrease in intermediate positions is not noticeable to the user or not readily noticeable to the user, such that it does not affect the user's experience. The final display state of the object is not affected by decreasing the input event velocity. For example, the final position of an object moved across the screen in a swipe remains the same regardless of the change in input event velocity.

As can be seen, the reduction in draw commands generated and sent by the server reduces the load on the server and on the client device 900. Since the client device 900 receives fewer draw commands, it therefore does not have to process or interpret as many draws commands. Also, the reduction in draw commands reduces the amount of data that needs to be sent between the server and the client device 900, allowing the client device 900 and/or the server to provide the same or similar user experience when the network bandwidth is low (e.g., due to poor wireless signal quality).

In some embodiments, the threshold velocity corresponds to the refresh or scan rate of the display screen (e.g., 120 Hz or 240 Hz). The display screen cannot display draw commands that are sent at a rate greater than the display screen's refresh rate. Therefore, a reduction in the input event velocity to match or correspond to the refresh rate of the display screen will be not be noticeable to the user. In other embodiments, the threshold velocity corresponds to the "frame rate" that is acceptable for the user's experience. As an example, movies are traditionally displayed at a frame rate of 24 frames per second (though recent movies are displayed at a higher frame rates such as 48 frames per second), which could be considered a threshold velocity for a movie viewer. The movie viewer will not notice a decrease in the quality of the movie if it is slowed down from 100 frames per second to 24 or 48 frames per second, as such a difference is not perceptible to the human eye/brain.

The other new component in client device 900 is sensor memory 418, which is in communication with sensors 406. Sensor memory 418 is configured to temporarily store data acquired by sensors 406. After storing the data in sensor memory 418, client device 900 transmits the stored data to the server (via sensors 406, input event generator 404, velocity tracker 410, and RX/TX 420) where it can be securely stored. After transmitting the stored data to the server, client device 900 deletes the stored data from sensor memory 418. In one example, the client device 900 captures an image through a sensor 406 for a camera. The data representing the image is first temporarily stored in sensor memory 416. Next, the client device 900 sends the data representing the image to the server. The client device 900 then securely deletes the data representing the image from sensory memory 418. The user can later display the photo image on client device 900 through a request on the user interface, which causes the server to send draw commands to client device 900 that cause client device 900 to reproduce the photo image. Of course, a photo image is just one example of the data that can be captured by sensors 406 and offloaded to the server for later use. Other examples include GPS data, physical sensor data (e.g., temperature), or other data acquired by sensors 406.

As can be seen, an advantage to the sensor memory 418 is that client device 900 can be used in high-security applications (e.g., military, espionage, etc.) where it is desirable to reduce the information stored on the client device, for example in case of theft or capture. For example, access to the server can be disabled if the client device 900 is stolen or captured at which point the value of client device 900 substantially decreased since it contains little or no data.

Figure 10:
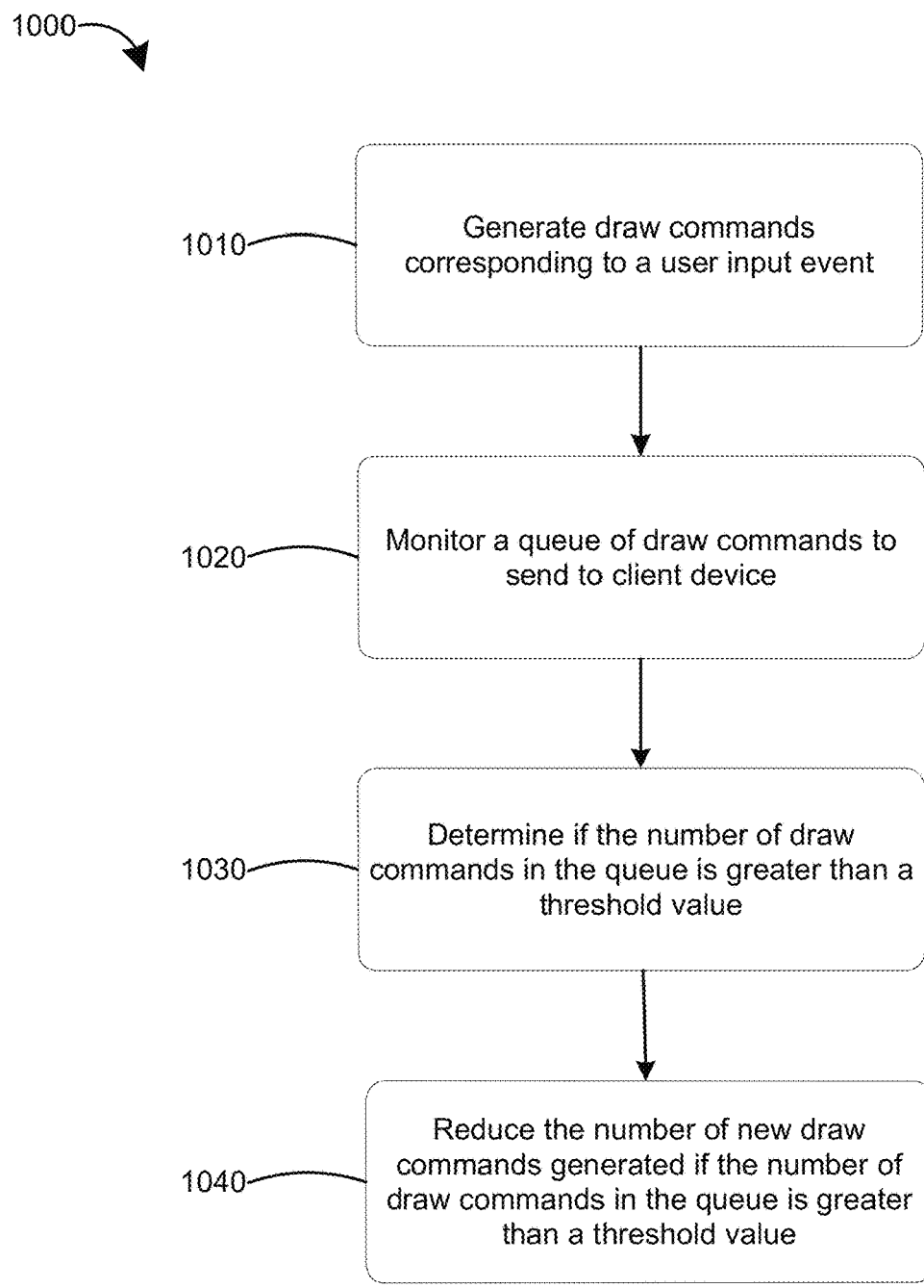
FIG. 10 is a flow chart of a method for reducing the data sent from a server to control a display of a client device according to one or more embodiments.

FIG. 10 is a flow chart 1000 of a method for reducing the data sent from a server to control a display of a client device according to one or more embodiments. In step 1010, the server generates a plurality of draw commands that correspond to a user input event, such as a user moving an object in a swipe motion on a touch screen. In step 1020, the server monitors a queue of draw commands to send to the client device. In step 1030, the server determines if the queue is greater than a threshold value. In step 1040, the sever reduces the number of new draw commands generated If the queue is greater than the threshold value. The reduction in the number of draw commands can be accomplished using choreographer 303, described above.

Figure 11:
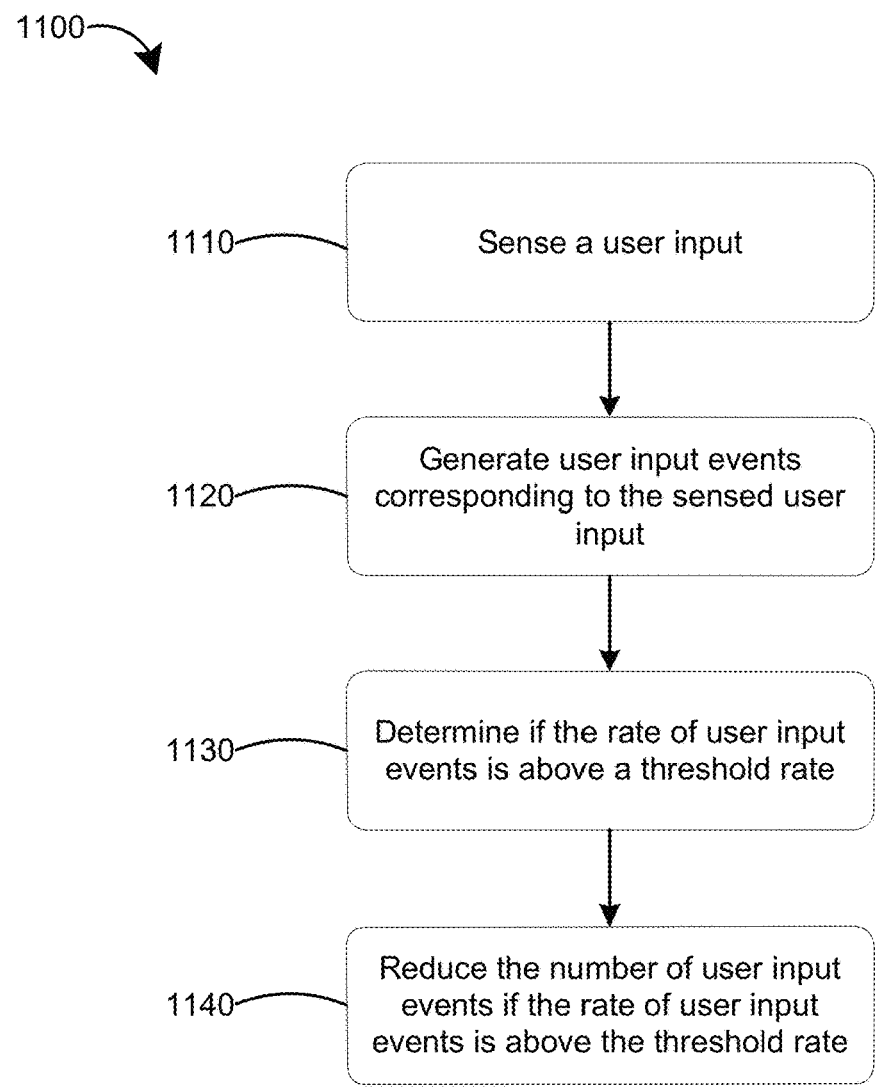
FIG. 11 is a flow chart of a method for reducing the data requested by a client device for display thereon according to one or more embodiments.

FIG. 11 is a flow chart 1100 of a method for reducing the data requested by a client device for display thereon according to one or more embodiments. In step 1110, the client device senses a user input via one or more sensors, such as a user's swipe on a touch screen display, that corresponds to a desired display state on the client device. In step 1120, the client device generates a plurality of user events that correspond to the sensed user input. For example, the user input events can include the coordinates over which the user swiped a finger on the touch screen display. In step 1130, the client device determines if the rate of user input event is above a threshold rate. For example, if the user quickly swipes his finger across the touchscreen, there may be many user events in the short time period of the swipe, as discussed above. In step 1140, the client device decreases the number of user events to send to the server if the rate of user events exceeds the threshold rate. In some embodiments, steps 1130 and 1140 can be performed using velocity tracker 410 described above.

Figure 12:
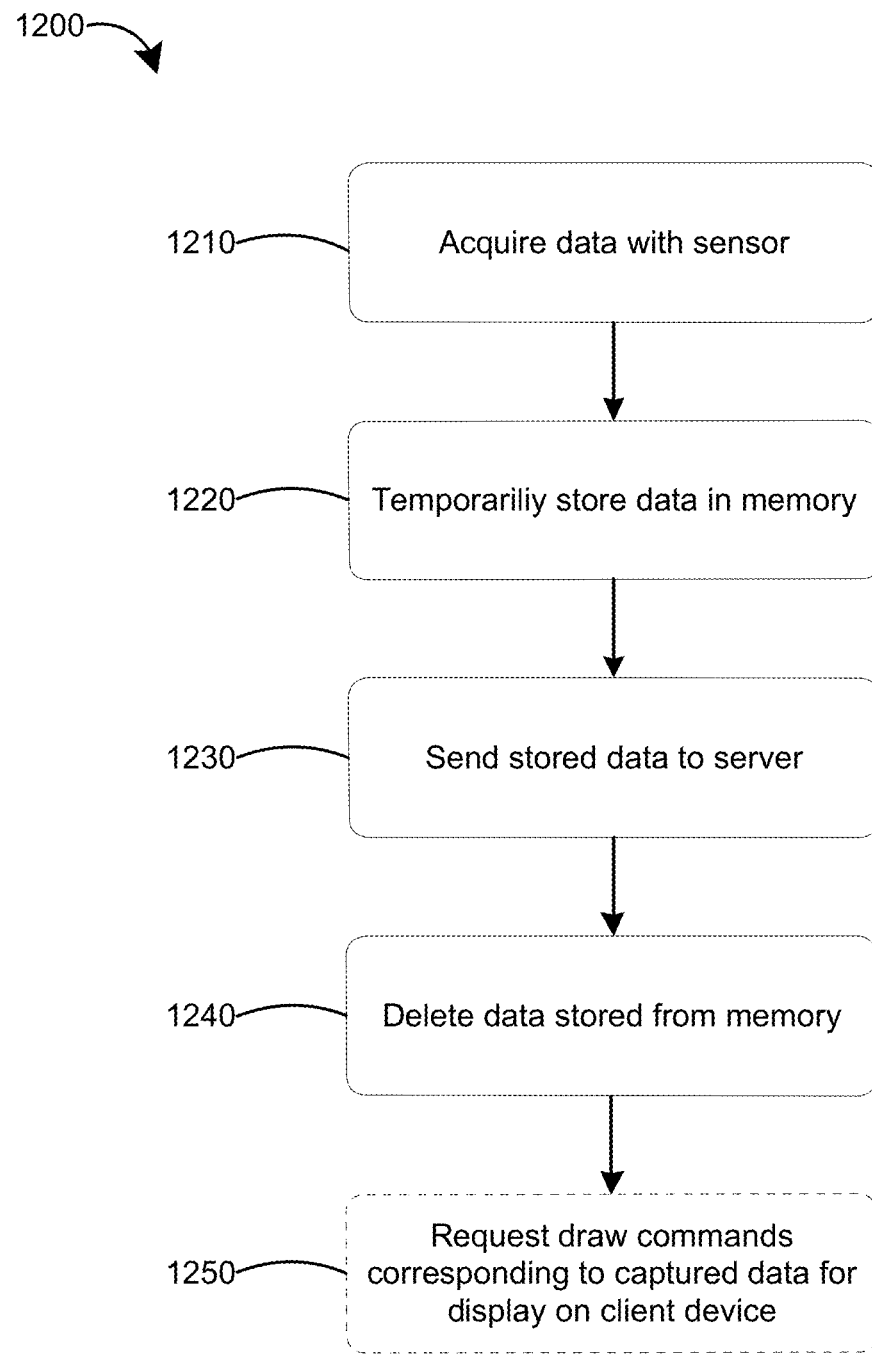
FIG. 12 is a flow chart of a method for securely acquiring data with a client device according to one or more embodiments.

FIG. 12 is a flow chart 1220 of a method for securely acquiring data with a client device according to one or more embodiments. In step 1210, sensors on client device capture or acquire data, such capturing a photograph using a camera on the client device. In step 1220, the captured data (e.g., corresponding to the photograph) is stored in a memory of the client device, such as sensor memory 418 described above. In step 1230, the client device sends the captured data to the server, for example in an encrypted or other secured form. In step 1240, the client device deletes the captured data from its memory (e.g., sensor memory 418). In optional step 1250, the client device requests draw commands from the server so that client device can display the previously-captured data. For example, the draw commands can reproduce the photograph previously taken with the camera on client device.

In some aspects, the present system and methods speed up virtual desktop and remote display capabilities in server-client architectures. In other aspects, the present system and methods improve the security of the client device. Of course, the discussion herein framing the delivery and receipt of draw commands and display data as server-client like is not meant to limit the overall disclosure in that any two properly configured machines can exchange information and data as described to achieve this goal. So the nature of the machines and the specifics of their connection as well as the nature of the Of course the above examples are provided as examples of the operation and construction of the system and method of the invention. Many of the exemplary features of these embodiments can be revised or alternates chosen to achieve a same or equivalent end. Therefore, the invention is not limited by the above examples, and those skilled in the art are expected to find custom implementations and extensions of this disclosure suiting their applications and ends along these lines, all of which are comprehended by the following claims.

What is claimed is:

1. A method for controlling a display of a client device, comprising:
   in a server coupled to said client device by a communication link:
      determining a desired display state of said display including determining display data needed to achieve said desired display state;

generating draw commands comprising instructions for configuring said display of the client device to achieve the desired display state;

placing the draw commands in a draw command queue to send to the client device over a network communication link;

monitoring a length of the draw command queue, the length corresponding to a number of the draw commands in the draw command queue;

determining if the length of the draw command queue exceeds a threshold value; and reducing a rate of new draw commands generated when the length of the draw command queue exceeds the threshold value.

2. The method of claim 1, further comprising maintaining the number of new commands generated when the length of the draw command queue is lower than or equal to the threshold value.

3. The method of claim 1, further comprising:

determining if a rate of draw command acknowledgements received from said client device falls below a first threshold rate of draw command acknowledgements; and reducing said rate of said new draw commands generated when the rate of draw command acknowledgements falls below the first threshold rate of draw command acknowledgements.

4. The method of claim 3, further comprising:

determining if the rate of draw command acknowledgements received from said client device exceeds a second threshold rate of draw command acknowledgements; and increasing said rate of said new draw commands generated when the rate of draw command acknowledgements exceeds the second threshold rate of draw command acknowledgements.

5. The method of claim 3, further comprising:

determining that a second portion of said desired display state requires new draw commands that do not exist in said client device; and transmitting said new draw commands to said client device, said new draw commands comprising instructions for configuring said display of the client device to achieve the second portion of said desired display state.

6. The method of claim 1, further comprising:

determining that a first portion of said desired display state corresponds to a user manipulation of an object in preexisting display data stored in a memory on said client device;

sending an abbreviated code to said client device, the abbreviated code representing a sequence of draw commands stored in said memory to achieve said first portion of said desired display state; and sending a manipulation draw command to said client device, said manipulation draw command comprising instructions corresponding to a user manipulation of said object.

7. The method of claim 6, wherein said user manipulation is one of a zoom, a translation, a rotation, or a skew of said object.

8. A server system comprising:

a processor;

a communication link interface coupling said server to a connected client device;

a data storage unit including a location storing pre-stored display data sent by said server to said client device;

a data storage unit including a location storing draw commands;

an input event generator that handles input event signals from said client device;

a draw command generator that generates draw commands;

a stream comparator that determines whether said draw commands are required to be sent to said client device;

a choreographer that determines whether a length of a draw command queue of said draw commands to be sent to said client device exceeds a threshold value; and a window compositor that manages at least one window's behavior at said client device.

9. The system of claim 8, wherein said choreographer generates a command to said draw command generator to reduce a number of new draw commands generated by said draw command generator by said when said length of said draw command queue exceeds said threshold value.

10. The system of claim 8, wherein said reduced number of new draw commands corresponds to a display of fewer intermediate positions or orientations of an object displayed on said client device.

11. The system of claim 8, wherein the stream comparator sends an abbreviated code and a manipulation draw command if said input event signal corresponds to a user manipulation of a pre-stored image stored on said client device, said abbreviated code representing a sequence of draw commands stored in said client device to achieve said pre-stored image, said manipulation draw command corresponding to said user manipulation of pre-stored image.

12. The system of claim 11, wherein said user manipulation is one of a zoom, a translation, a rotation, or a skew of said object.

13. A method for controlling a display of a client device, the method comprising:

in said client device:

sensing a user input corresponding to a desired display state of said display;

generating user input events corresponding to said user input;

determining if a rate of said user input events exceeds a threshold rate;

reducing a number of said user input events when said rate of said user input events exceeds said threshold rate; and sending said reduced number of said user input events to a server when said rate of said user input events exceeds said threshold rate.

14. The method of claim 13, further comprising reducing a sampling rate of said user input events.

* * * * *